2 Sheets—Sheet 1.
A. REITZE.
SHARPENING MACHINE.
No. 180,067. Patented July 18, 1876.
Fig. I.
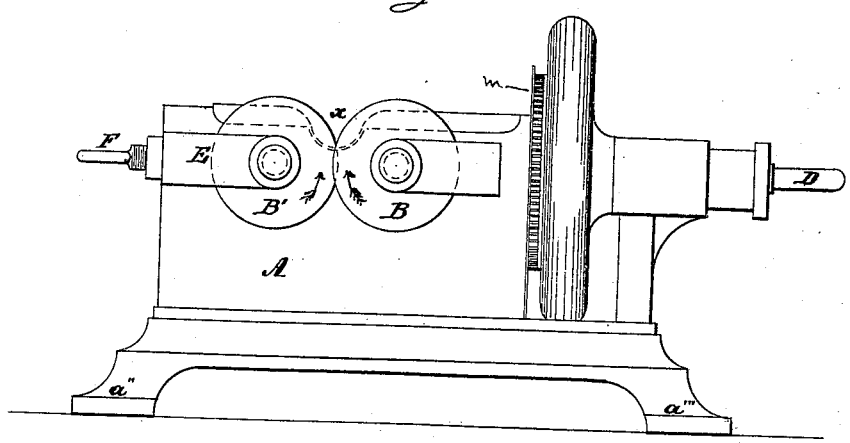
Fig. II.
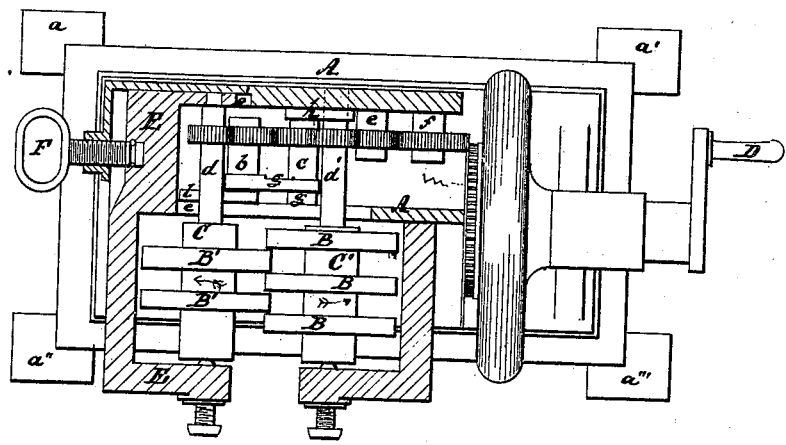
Witnesses.
W. Ehut
C. J. Streightoff
Inventor.
August Reitze
per Henry E. Roeder
Attorney.

2 Sheets—Sheet 2.
A. REITZE.
SHARPENING MACHINE.
No. 180,067. Patented July 18, 1876.
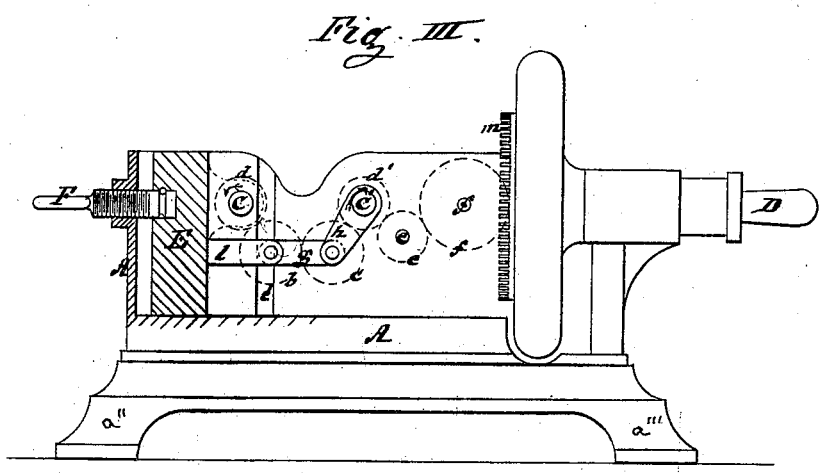

UNITED STATES PATENT OFFICE.

AUGUST REITZE, OF HANOVER, GERMANY.

IMPROVEMENT IN SHARPENING-MACHINES.

Specification forming part of Letters Patent No. 180,067, dated July 18, 1876; application filed May 27, 1876.

*To all whom it may concern:*

Be it known that I, AUGUST REITZE, of Hanover, Germany, have invented a new and Improved Grinding and Sharpening Apparatus, of which the following is a specification:

My invention consists of an apparatus with which knives, &c., may be easily and quickly ground, and is more especially intended for household use.

In the accompanying drawing, Figure I represents a front view of the machine. Fig. II is a plan of the same; and Fig. III is a longitudinal section, showing the gearing.

This apparatus consists of a box or case, A, standing on four legs, $a$, $a'$, $a''$, and $a'''$, and from which project horizontally the sharpening-stones B B B and B' B'. These may be five, as shown, or more in number, and are arranged in such a manner that those turning on the shaft C run in the spaces between the others, turning on shaft C'. These shafts run in opposite directions, as shown by the arrows.

The apparatus is worked by turning the handle D, and the motion thus produced is communicated from the stern-wheel $m$, through the gearing $f$ and $e$, to the wheel $d'$, fast on the shaft C'. From this shaft C' motion is communicated, through the gear-wheels $b$ and $c$, to the wheel $d$, fast on the shaft C. The shaft C' runs in suitable bearings in the frame or case A, and the shaft C runs in bearings in a sliding piece, E, fitted in the end of the frame or case A, capable of sliding, and regulated and fixed in its desired position by the screw-bolt F, passing through the end of the case A. By this arrangement the shaft C, with its stones B', can be advanced or drawn back, and as the stones wear out they can still be kept at the same distance to each other.

The wheel $b$ is supported by the arm $l$, attached to the sliding piece E, and the wheel $c$ is supported by the arms $g$ and $h$. The end of the arm $g$ is held upon the center pin in the end of the arm $l$, upon which the wheel $b$ turns, and the end of the arm $h$ is supported by the shaft C'. By this arrangement, if the frame E is moved backward or forward, the wheels $b$ and $c$ are always kept in gear with the wheels $d$ and $d'$, fast on the shafts C and C'.

The method of sharpening knives on this apparatus is to turn the handle D with the right hand, while the knife is drawn backward and forward between the stones at $x$.

What I claim as my invention, and desire to secure by Letters Patent, is—

In combination with the shafts C and C', the wheel $b$, supported on the arm $l$, attached to the movable frame E, and the wheel $c$, supported by the arms $g$ and $h$, arranged in the manner and for the purpose substantially as set forth and described.

AUGUST REITZE.

Witnesses:
   S. GOLDSCHMIDT,
   JOS. BEER.